United States Patent
Huber et al.

(10) Patent No.: US 9,794,775 B2
(45) Date of Patent: Oct. 17, 2017

(54) METHODS AND DEVICES FOR PERFORMING A MOBILE NETWORK SWITCH

(71) Applicant: GIESECKE & DEVRIENT GMBH, München (DE)

(72) Inventors: Ulrich Huber, München (DE); Thomas Larsson, Älvsjö (SE)

(73) Assignee: GIESECKE+DEVRIENT MOBILE SECURITY, Munich (DE)

( * ) Notice: Subject to any disclaimer, the term of this patent is extended or adjusted under 35 U.S.C. 154(b) by 0 days.

(21) Appl. No.: 14/910,992

(22) PCT Filed: Aug. 8, 2014

(86) PCT No.: PCT/EP2014/002188
§ 371 (c)(1),
(2) Date: Feb. 8, 2016

(87) PCT Pub. No.: WO2015/018531
PCT Pub. Date: Feb. 12, 2015

(65) Prior Publication Data
US 2016/0192179 A1    Jun. 30, 2016

(30) Foreign Application Priority Data
Aug. 9, 2013   (EP) .................................. 13003978

(51) Int. Cl.
*H04W 8/20* (2009.01)
*H04W 76/02* (2009.01)
(Continued)

(52) U.S. Cl.
CPC .............. *H04W 8/20* (2013.01); *H04W 8/265* (2013.01); *H04W 12/06* (2013.01); *H04W 36/14* (2013.01); *H04W 76/02* (2013.01); *H04W 8/205* (2013.01)

(58) Field of Classification Search
CPC ....... H04W 8/183; H04W 8/20; H04W 8/265; H04W 12/04; H04W 12/061;
(Continued)

(56) References Cited

U.S. PATENT DOCUMENTS

| 8,812,836 B2 * | 8/2014 | Meyerstein | H04W 8/265 |
| | | | 713/155 |
| 2007/0254711 A1 | 11/2007 | Young et al. | |
| 2010/0136967 A1 | 6/2010 | Du et al. | |

OTHER PUBLICATIONS

CSMG, "Reprogrammable SIMs: Technology, Evolution and Implications," URL: http://stakeholders.ofcom.org.uk/binaries/research/telecoms-research/reprogrammable-sims.pdf, Sep. 25, 2012, pp. 1-95.

(Continued)

*Primary Examiner* — Nam Huynh
(74) *Attorney, Agent, or Firm* — Workman Nydegger

(57) ABSTRACT

A method of performing a switch from a first mobile network to a second mobile network by a mobile terminal comprising a secure element includes the steps of: (a) attaching to the first mobile network using a first attachment message containing a first identification data element, preferably a first IMSI, of a first subscription profile; and (b) attaching to the second mobile network by an attachment process including a second attachment message containing a second identification data element, preferably a second IMSI, of a second subscription profile. The second mobile network is configured to monitor at least parts of the attachment process, to determine the second identification data element contained therein and to forward this information to a subscription management server in order to confirm the successful attachment of the secure element to the second mobile network.

16 Claims, 2 Drawing Sheets

(51) Int. Cl.
H04W 36/14 (2009.01)
H04W 12/06 (2009.01)
H04W 8/26 (2009.01)

(58) Field of Classification Search
CPC . H04W 36/0022; H04W 36/14; H04W 76/02; H04W 76/021; H04W 76/025; H04W 8/205
See application file for complete search history.

(56) References Cited

OTHER PUBLICATIONS

Extended European Search Report for corresponding European Application No. 13003978.7, Jan. 31, 2014.
International Search Report for corresponding International PCT Application No. PCT/EP2014/002188, Jan. 20, 2015.

* cited by examiner

METHODS AND DEVICES FOR PERFORMING A MOBILE NETWORK SWITCH

FIELD OF THE INVENTION

The invention relates to mobile communications in general and in particular to methods and devices for performing a switch from a first subscription profile for attaching to a first mobile network to a second subscription profile for attaching to a second mobile network by a mobile terminal comprising a secure element, such as a subscriber identity module (SIM), an eUICC/UICC or the like.

BACKGROUND OF THE INVENTION

Communicating by means of a mobile terminal, such as a mobile phone, via a public land mobile network (PLMN; also referred to as a mobile or cellular communications network herein) operated by a mobile network operator (MNO) generally requires the mobile terminal to be equipped with a secure element for securely storing data uniquely identifying the user of the mobile terminal (also called subscriber). For instance, in the context of a mobile terminal configured to communicate according to the Global System for Mobile Communications (GSM), currently the world's most popular standard for mobile communications systems, the secure element is called a subscriber identity module (SIM) and is usually provided in the form of a smart card. According to the GSM standard, the technical features of which are defined by a large number of interrelated and mutually dependent specifications published by the ETSI standardization organization, the SIM contains subscription credentials for authenticating and identifying the user of the mobile terminal, including in particular an International Mobile Subscriber Identity (IMSI) and an authentication key $K_i$. These subscription credentials are generally stored on the SIM as part of a subscription profile by the SIM manufacturer/vendor or the MNO during a SIM personalization process prior to providing the user of the mobile terminal with his SIM. A non-personalized SIM is generally not suited for use in a mobile terminal, i.e. using the services provided by a PLMN with a non-personalized SIM without a subscription profile is not possible.

One particular field of application of secure elements, such as SIMs, eUICCs, UICCs and the like, which is expected to grow rapidly in the future is M2M (machine-to-machine) communication, i.e. the communication between machines over a cellular communications network without human intervention, also called the Internet of things. In M2M communication data is automatically transmitted between many different types of machines equipped with a secure element in the form of a M2M module, such as TV systems, set top boxes, vending machines, vehicles, traffic lights, surveillance cameras, sensor devices, and the like. It is foreseeable that at least for some of these devices it will not be possible or at least very difficult to provide the secure element beforehand with a subscription profile, including for instance an IMSI. This is because in a lot of M2M devices the secure element will most likely be implemented in the form of a surface mounted chip or chip module without the possibility of providing the secure element with a subscription profile beforehand. Consequently, once in the field, these M2M devices and their non-personalized secure elements generally require the provision of a subscription profile over-the-air.

When using the services provided by a MNO, in particular communicating via the PLMN provided by the MNO, the user of a mobile terminal is usually charged a certain monthly fee by the MNO. If the mobile user wants, for instance due to a lower monthly charge and/or superior services, to change to a different MNO, he generally has to manually replace the SIM provided by the current MNO and containing the subscription profile necessary for attaching to the PLMN of the current MNO by the SIM provided by the new MNO and containing the subscription profile necessary for attaching to the PLMN of the new MNO. Certainly, it would be easier for the user, if instead of this conventional process of switching to a new MNO by manually replacing the SIM it would be possible to use one and the same secure element in the form of a SIM that can be "reprogrammed" over-the-air.

Conventional methods are known for downloading a target subscription profile over-the-air onto a secure element with an already existing subscription profile and performing a switch from the already existing subscription profile to the target subscription profile associated with a target mobile network. Moreover, it is known to confirm the successful switch to the target mobile network by using a SMS or USSD message or by means of a BIP (bearer independent protocol). However, these communication means for confirming a mobile network switch are not always available, for instance, because SMS cannot be used on the target mobile network due to no credit yet. Nevertheless, also in these cases it is important to know whether the switch to a target mobile network has been successful, especially in the field of M2M devices, i.e. devices not directly overseen by a user. There is, therefore, a need for improved methods and devices for performing a switch from a first mobile network to a second mobile network by a mobile terminal comprising a secure element, such as a subscriber identity module (SIM), an eUICC/UICC or the like.

SUMMARY OF THE INVENTION

The above object is achieved according to the present invention by the subject-matter of the independent claims. Preferred embodiments of the invention are defined in the dependent claims.

According to a first aspect the invention provides for a method of performing a switch from a first mobile network (herein also referred to as provisioning mobile network) to a second mobile network (herein also referred to as target mobile network) by a mobile terminal comprising a secure element. The method comprises the steps of: (a) attaching to the first mobile network using a first attachment message containing a first identification data element, preferably a first IMSI, of a first subscription profile; and (b) attaching to the second mobile network by an attachment process including a second attachment message containing a second identification data element, preferably a second IMSI, of a second subscription profile, wherein the second mobile network is configured to monitor at least parts of the attachment process, to determine the second identification data element contained therein and to forward this information to a subscription management server in order to confirm the successful attachment of the secure element to the second mobile network.

Preferably the second mobile network is configured to detect the second attachment message containing the second identification data element.

According to preferred embodiments of the invention, the method comprises the following additional step after step (b): (c) confirming to the secure element that the switch has been successful. Preferably, in step (c) the secure management server provides the secure element with the MSISDN assigned to the second identification data element in the second mobile network.

Preferably the second subscription profile including the second identification data element is downloaded by the secure element from the subscription management server, while the secure element is attached to the first mobile network.

According to preferred embodiments of the invention, the step of downloading the second subscription profile includes the additional step of receiving commands from the subscription management server to be executed by the secure element.

Preferably the method includes the additional step of informing the second mobile network about the second identification data element in order for the second mobile network to be able to monitor respective attachment processes.

According to preferred embodiments of the invention, the second mobile network comprises a signal monitoring unit that is implemented in hardware and/or software and is configured to monitor at least parts of the attachment process, to determine the second identification date element contained therein and to forward this information to a subscription management server in order to confirm the successful attachment of the secure element to the second mobile network.

Preferably the first mobile network and/or the second mobile network are operated according to the GSM standard and the second attachment message is a "Send Authentication Information" message.

According to preferred embodiments of the invention, the first subscription profile is a provisional subscription profile that is stored on the secure element during the manufacturing and/or personalization process of the mobile terminal and/or the secure element.

According to a second aspect the invention provides for a secure element configured to perform the steps of the method according to the first aspect of the invention.

Preferably the secure element is a subscriber identity module (SIM) for authentication/identification of a subscriber in the mobile network. Such a SIM communicates with the mobile terminal via a card reader therein and can be removed in principle from the mobile terminal to be either replaced by a different SIM and/or used in a different mobile terminal. Alternatively, the secure element is an integral part of the mobile terminal such as a hard-wired chip module. Such embedded secure elements are known, for instance, as embedded Universal Integrated Circuit Cards (eUICCs). Preferably, the secure element supports storage of multiple subscription profiles which may be associated with different MNOs. Generally, only one subscription profile is active at a time.

According to a third aspect the invention provides for a mobile terminal containing a secure element according to the second aspect of the invention.

The mobile terminal according to the present invention comprises means for communicating with a cellular communications network, in order to receive a new subscription profile. Preferably, the mobile terminal is implemented in form of a smart phone, a tablet PC, a notebook, a PDA, or the like. Alternatively the mobile terminal can be a multimedia device such as digital picture frame, audio equipment, a TV system, a set top box, an e-book reader and so on. By way of example, the term "mobile terminal" also includes any kind of machinery, like vending machines, vehicles, smart-meters and the like that are configured to communicate via a cellular communications system in the context of a M2M system.

According to a fourth aspect the invention provides for a subscription management server configured to interact with the secure element according to the second aspect of the invention according to the method according to the first aspect of the invention.

These and other features, characteristics, advantages, and objects of the invention will be clear from the following detailed description of preferred embodiments, given as a non-restrictive example, under reference to the attached drawings. The person skilled in the art will appreciate, in particular, that the above preferred embodiments can be combined in several ways, which will result in additional advantageous embodiments that are explicitly supported and covered by the present invention. In particular, the person skilled in the art will appreciate that the above described preferred embodiments can be implemented in the context of the above mentioned different aspects of the invention.

DETAILED DESCRIPTION OF PREFERRED EMBODIMENTS

Figure 1:
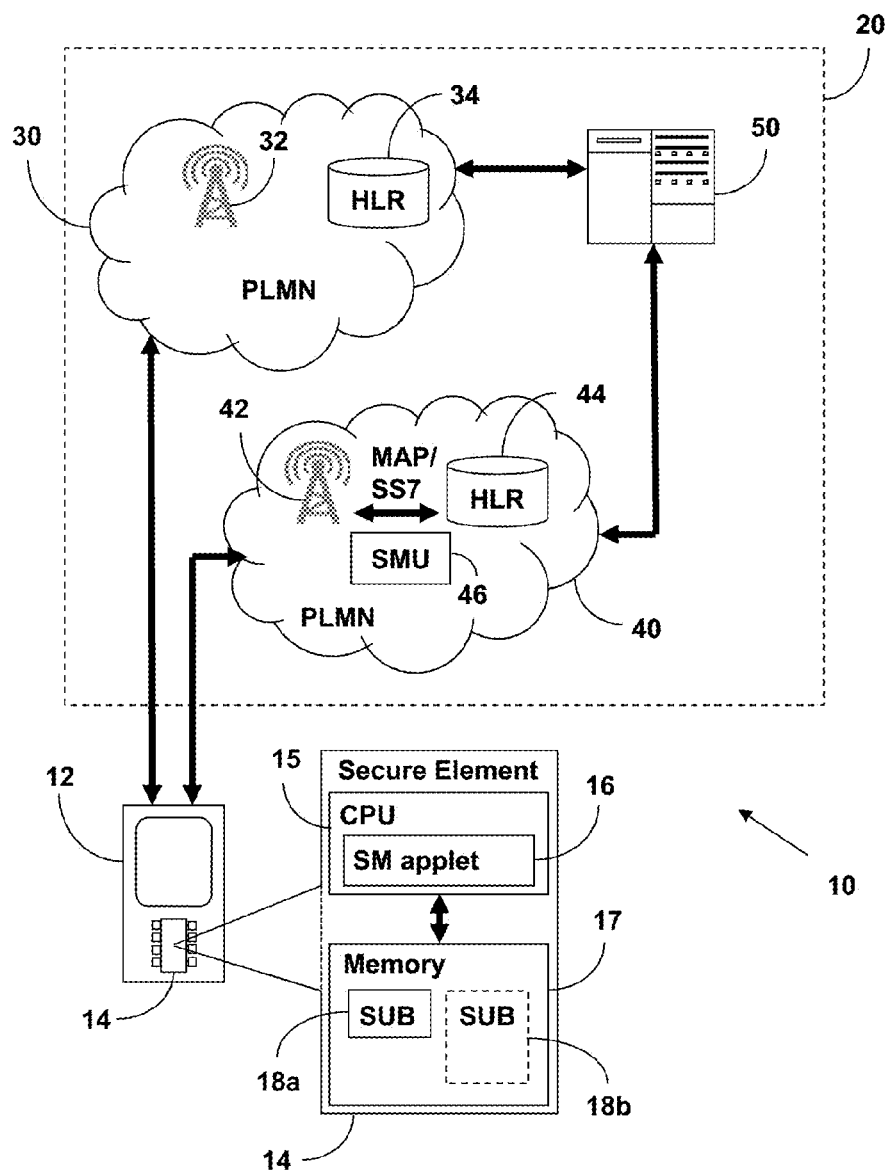
FIG. 1 shows a schematic overview of a mobile communications system illustrating different aspects of the present invention.

FIG. 1 shows schematically the components of a communications system 10 as well as some of the communication channels or links between the components of this system 10 that illustrate different aspects of the present invention. Although the below detailed description will refer to a "mobile" terminal, the person skilled in the art will appreciate that the present invention can be advantageously implemented in the context of any kind of terminal that is configured to communicate via a mobile or cellular communications network. In other words, the attribute "mobile" used herein refers to the ability of a terminal to communicate via a mobile or cellular communications network (or short mobile network), also including IP based mobile communication networks.

An exemplary mobile terminal 12 is shown in FIG. 1 including a secure element 14 for securely storing and processing data that uniquely identifies the mobile terminal 12 and/or its user, i.e. the subscriber. As indicated in FIG. 1, the mobile terminal 12 preferably is a mobile phone, smart phone or a similar device. The person skilled in the art will appreciate, however, that the mobile terminal 12 according to the present invention can be implemented in the form of other devices as well, such as a tablet or notebook computer, a TV system, a set top box, a vending machine, a vehicle, a surveillance camera, a sensor device and the like.

According to preferred embodiments of the invention the secure element 14 is configured as an eUICC or UICC with a SIM application running thereon, i.e. a secure element that can be mounted in the mobile terminal 12 and used in cellular communications systems for unique and secure subscriber identification as well as for the provision of different special functions and value-added services. Alternatively, the secure element 14 could be configured as a removable subscriber identity module (SIM), the SIM currently being the most popular type of secure element. The person skilled in the art will appreciate, however, that other types of secure elements that, depending on the underlying generation and type of cellular communications system standard, are designated as USIM, R-UIM, ISIM and the like, are also encompassed by the present invention. Moreover, the secure element 14 could be a M2M module or a Trusted Execution Environment (TEE) implemented as part of the mobile terminal 12.

The mobile terminal 12 is configured to communicate via the air interface (or radio link) with a first cellular communications network or public land mobile network (PLMN) 30 or a second cellular communications network or public land mobile network (PLMN) 40 of a mobile communications system 20. Preferably, the first PLMN 30 (also referred to herein as the provisioning PLMN 30) is operated by a first mobile network operator (MNO) and the second PLMN 40 (also referred to herein as the target PLMN 30) is operated by a second mobile network operator (MNO). Preferably, the provisioning PLMN 30 and the target PLMN 40 can be accessed from substantially the same physical location. According to preferred embodiments the provisioning PLMN 30 and/or the target PLMN 40 are operated according to the GSM standard.

In the following, preferred embodiments of the invention will be described in the context of mobile or cellular communications networks according to the standards of the Global System for Mobile communication (GSM), as specified in a number of specifications provided by ETSI. However, the person skilled in the art will appreciate that the present invention may be advantageously applied in connection with other cellular communications systems as well. Such systems include third-generation cellular communications systems (3GPP), such as the Universal Mobile Telecommunications System (UMTS), and next generation or fourth-generation mobile networks (4G), such as Long Term Evolution (LTE), as well as other cellular communications systems.

As is well known to the person skilled in the art, a PLMN configured according to the GSM standard generally comprises a base station subsystem consisting of one or more base transceiver stations that define respective cells of the PLMN and are connected to a base station controller. Generally, the base station controller is one of several base station controllers that communicate with a common mobile switching center (MSC). Often, a local database called Visitor Location Register (VLR) for keeping track of the mobile users currently located within the cells covered by a MSC (i.e. the MSC service area) is incorporated in the MSC. The MSC provides essentially the same functionality as a central office switch in a public-switched telephone network and is additionally responsible for call processing, mobility management, and radio resource management. The MSC is further in communication with a home location register (HLR), which is the primary database of the PLMN that stores information about its mobile users required for authentication. To this end, the HLR generally is in communication with an authentication center (AUC). The person skilled in the art will appreciate that although the above described components of a conventional GSM system may have different names in different or consecutive standards for mobile communications networks, the underlying principles used therein are substantially similar and, therefore, compatible with the present invention.

As is known to the person skilled in the art, the communication means between the above described components of a PLMN may be proprietary or may use open standards. The protocols may be SS7 or IP-based. SS7 is a global standard for telecommunications defined by the International Telecommunication Union (ITU) Telecommunication Standardization Sector (ITU-T). The standard defines the procedures and the protocols by which network elements in the public switched telephone network (PSTN) exchange information over a digital signaling network to effect wireless (cellular) and wired call setup, routing and control. The SS7 network and protocol are used for e.g. basic call setup, management, wireless services, wireless roaming, and mobile subscriber authentication, i.e. enhanced call features providing for efficient and secure worldwide telecommunications. How the network elements are grouped or left separate and the interfaces—whether proprietary or open—between these elements are left to the MNO.

Of the above described components of a PLMN only the following ones are shown in the schematic drawing of FIG. 1 for ease of explanation: an exemplary base transceiver station 32 and a HLR 34 for the provisioning PLMN 30 and an exemplary base transceiver station 42 and a HLR 44 for the target PLMN 40. The provisioning PLMN 30 and the target PLMN 40 are each at least in temporary communication with a subscription management server 50, as will be described in more detail further below. The provisioning PLMN 30 and/or the target PLMN 40 moreover could each comprise a SMS-C (Short Message Service Center) for storing, forwarding, converting and delivering SMS messages or be connected to a common SMS-C.

As can be taken from the enlarged view of the secure element 14 in FIG. 1, the secure element 14 preferably comprises a central processing unit (CPU) 15. Preferably, the CPU 15 is configured such that at least one subscription management application 16 (SM applet) can be executed on the CPU 15 providing for some of the features that will be described in the context of FIG. 2 in more detail further below. The subscription management application 16 could be implemented, for instance, as a Java Applet. For providing an execution environment for the subscription management application 16 a secure element operating system (not shown in FIG. 1) is preferably implemented on the CPU 15.

Moreover, the secure element 14 preferably comprises a memory unit 17, which preferably is implemented as a non-volatile, rewritable memory unity, e.g., a flash memory. As can be taken from FIG. 1, a first subscription profile (SUB) 18a is stored in the memory unit 17 of the secure element 14. This first subscription profile 18a comprises data that allow the secure element 14 and the mobile terminal 12 to attach to the provisioning PLMN 30, i.e. data, such as subscription credentials, a MNO specific authentication algorithm, and the like. Preferably, at least parts of the memory unit 17 of the secure element 14 are configured to securely store the data therein, for instance any subscription credentials to be kept secret, such as an International Mobile Subscriber Identity (IMSI) and/or an authentication key $K_i$, that are part of the first subscription profile 18a. As indicated in FIG. 1, the memory unit 17 preferably provides several "slots" for accommodating additional subscription profiles, such as a second subscription profile (SUB) 18b, which is preferably provided by the subscription management server 50 according to the process shown in FIG. 2 and described in more detail further below.

Preferably, the first subscription profile 18a is stored in the memory unit 17 of the secure element 14 during the manufacturing and/or personalization process of the mobile terminal 12 and/or its secure element 14. Especially in the context of this preferred embodiment it is conceivable that the first subscription profile 18a is merely a provisional subscription profile only providing for basic services that allow the secure element 14 and mobile terminal 12 to communicate with the subscription management server 50 via the provisioning PLMN 30 and to download a more complete subscription profile providing for additional services, such as the second subscription profile 18b shown in FIG. 1. As a provisional subscription profile, such as the first subscription profile 18a shown in FIG. 1, generally provides only a limited functionality, the user of the mobile terminal 12 generally will be enticed to change to a more complete subscription profile providing for additional services, such as the second subscription profile 18b shown in FIG. 1.

As is known to the person skilled in the art, one of the essential steps involved in a conventional GSM attachment procedure is that the secure element 14 has to provide an identification data element in form of an IMSI (that is part of a subscription profile) to the target PLMN 40 in order for the target PLMN 40 to be able to identify the secure element 14. More specifically, the secure element 14 issues a "Send Authentication Information" message including the IMSI using the MAP (Mobile Application Part) protocol to the target PLMN 40. In the conventional GSM attachment procedure this message is routed by the receiving mobile switching center (MSC) on the basis of the IMSI contained therein to the home location register (HLR) 44 of the target PLMN 40 for requesting authentication triplets.

When the HLR 44 of the target PLMN 40 receives the IMSI and the request for authentication triplets, it first checks its database to make sure the IMSI is valid and is registered in the network. Once this has been accomplished, the HLR 44 of the target PLMN 40 forwards the IMSI and the request for authentication triplets to its AUC. The AUC uses the IMSI to look up the authentication key Ki associated with that IMSI. The AUC will also generate a 128-bit random number called RAND, which together with the authentication key Ki is fed into the A3 encryption algorithm. The output of the A3 encryption algorithm is a 32-bit number called Signed Response (SRES). The RAND number and the authentication key Ki are moreover fed into the A8 encryption algorithm. The output is a 64-bit number called Kc. The Kc is the ciphering key that is used in the A5 encryption algorithm to encipher and decipher the data that is being transmitted over the air interface to the mobile terminal 12. The RAND number, the SRES, and the ciphering key Kc form an authentication triplet that is unique to the IMSI used for creating this triplet. Once the AUC of the target PLMN 40 has generated such an authentication triplet, it forwards it to the HLR 44, which, in turn, sends it to the requesting MSC. The MSC stores the ciphering key Kc and the SRES but forwards the RAND number as the challenge of the GSM authentication procedure to the mobile terminal 12/secure element 14 and requests authentication.

The authentication key Ki is securely stored on the secure element 14 of the mobile terminal 12. The A3 and A8 encryption algorithms also reside on the secure element 14. The RAND number received from the MSC of the target PLMN 40 via the air interface and the authentication key Ki are fed into the A3 and A8 encryption algorithms to generate another signed response SRES* and the ciphering key Kc, respectively. The ciphering key Kc is stored on the secure element 14 and the generated signed response SRES* is send as the response of the GSM challenge-response authentication procedure back to the target PLMN 40. The MSC of the target PLMN 40 receives the signed response SRES* generated by the secure element 14 of the mobile terminal 12 and compares it with the signed response SRES generated by the AUC. If they match, the secure element 14 of the mobile terminal 12 is authenticated and can communicate with and via the target PLMN 40, i.e. the secure element 14 has successfully switched from the provisioning PLMN 30 to the target PLMN 40.

According to the present invention the communication profile associated with the above described conventional attachment procedure or at least parts thereof are used as a sort of fingerprint or indirect proof that the secure element 14 has successfully switched from the provisioning PLMN 30 to the target PLMN 40. To this end, the target PLMN 40 preferably comprises a signal monitoring unit (SMU) 46 that is appropriately located within the target PLMN 40 and configured to monitor the MAP/SS7 communication flow within the target PLMN 40 and, in particular, between the MSC and the HLR 44 thereof. In particular, the SMU 46 is configured to intercept the "Send Authentication Information" message sent from the secure element 14 to the target PLMN 40. Moreover, the SMU 46 is configured to extract from the MAP/SS7 communication flow between the MSC and the HLR 44 of the target PLMN 40 and, in particular, from the "Send Authentication Information" message the target IMSI provided by the secure element 14.

The operation of the SMU 46 in combination with the other elements of the communications system 10 shown in FIG. 1 will now be described in the context of a preferred embodiment of the invention under further reference to FIG. 2 for the case where in the beginning only the provisional subscription profile 18a is present on the secure element 14. From the following detailed description the person skilled in the art will appreciate, however, that the present invention can be also advantageously used in the case where in addition to the provisional subscription profile 18a also the target subscription profile 18b (and possibly other subscription profiles) is already present on the secure element 14.

Figure 2:
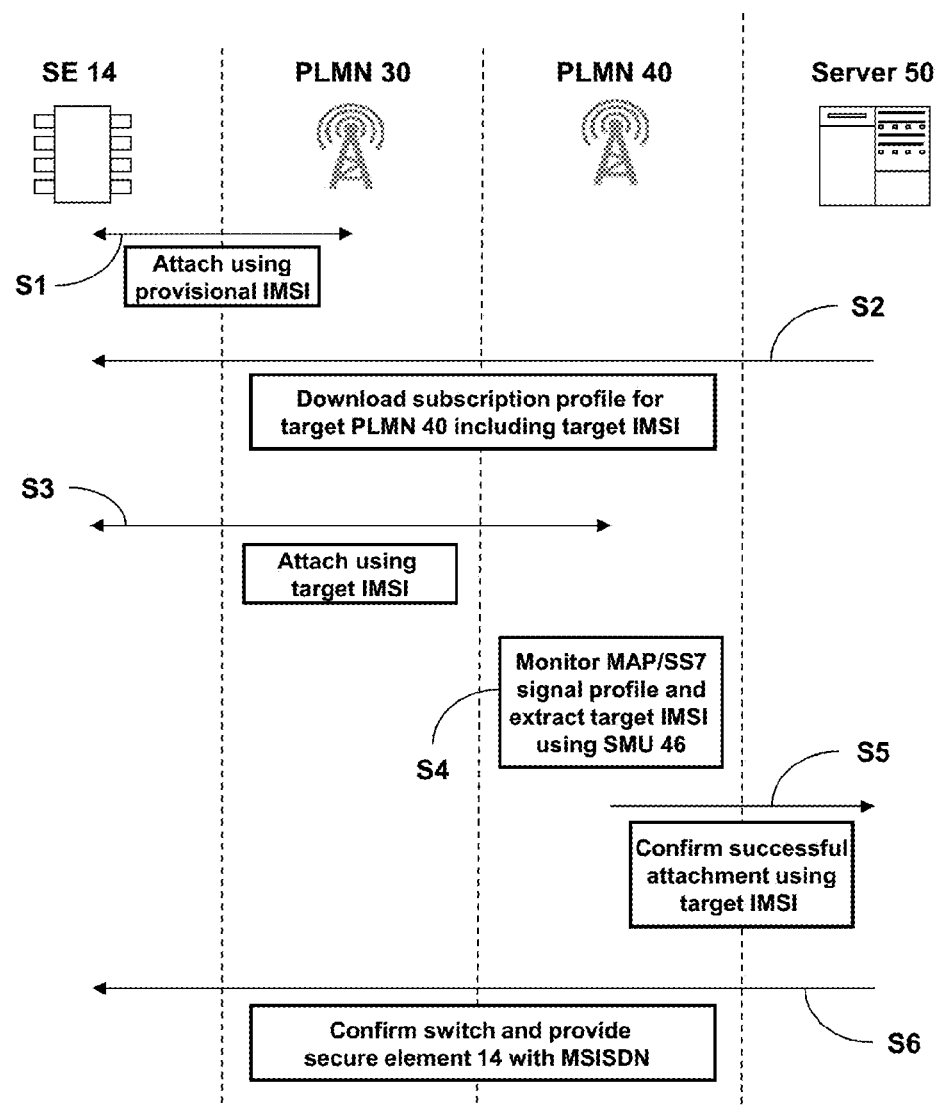
FIG. 2 shows a diagram illustrating a method for performing a mobile network switch from a first mobile network to a second mobile network of the mobile communications system of FIG. 1 according to a preferred embodiment of the invention.

In step S1 of FIG. 2 the secure element 14 authenticates itself vis-à-vis (i.e. attaches to) the provisioning PLMN 30 using its provisional subscription profile 18a including a first identification data element in form of a provisional IMSI. After a successful attachment to the provisioning PLMN 30 the secure element 14 downloads in step S2 of FIG. 2 the target subscription profile 18b including a second identification data element in form of a target IMSI from the SM server 50 for attaching to the target PLMN 40 and being able to utilize the services provided thereby. According to the present invention it is conceivable that along with downloading the target subscription profile 18b the SM server 50 provides the secure element 14 with a plurality of commands to be executed by the secure element 14, such as commands for storing the downloaded target subscription profile 18b in the non-volatile memory 17 of the secure element 14, erasing the provisional subscription profile 18a in the non-volatile memory 17 of the secure element 14 and the like.

Having downloaded the subscription profile for the target PLMN 40 in step S2 of FIG. 2 and having detached from the provisioning PLMN 30, the secure element 14 in step S3 of FIG. 2 attaches to the target PLMN 40 using the target IMSI by means of the GSM attachment session described above. As the GSM attachment session consists of several unique communication steps, the SMU 46 can by monitoring the signal profile determine that the corresponding messages/signals belong to an attachment session and, moreover, can extract the IMSI used in these messages, namely the target IMSI for attaching to the target PLMN 40 (step S4 of FIG. 2). Having detected such an attachment session and having extracted the corresponding IMSI, the SMU 46 passes this information on to the SM server 50 in step S5 of FIG. 2.

In step S6 of FIG. 2 the SM server 50 confirms to the secure element 14 that it has received this information about the switch from the provisioning PLMN 30 to the target PLMN 40. In addition to being a confirmation message the message sent from the SM server 50 to the secure element 14 in step S6 of FIG. 2 could comprise commands to be executed by the secure element 14, such as removing the provisional subscription profile 18*a* (in case this has not already been done in step S2 of FIG. 2) and the like.

Moreover, preferably the confirmation message sent from the SM server 50 to the secure element 14 in step S6 of FIG. 2 comprises the phone number of the secure element 14 in the target PLMN 40, i.e. the MSISDN (mobile subscriber ISDN) assigned to the target IMSI. Preferably, the SM server 50 obtains the MSISDN assigned to the target IMSI in step S5 of FIG. 2, as both the target IMSI and the assigned MSISDN are available from the HLR 44 of the target PLMN 40. Providing the secure element 14 with the MSISDN assigned to its IMSI, i.e. the target IMSI, might be necessary for at least some of the applications implemented on the secure element 14 and/or the mobile terminal 12 that require the MSISDN assigned to the target IMSI for being able to operate with the target PLMN 40.

The person skilled in the art will appreciate that the SMU 46 may take a variety of forms and generally can be implemented in hardware and/or software. For example, the SMU 46 may take the form of a software routine that resides on the same network element as the MSC or the HLR 44 of the target PLMN 40 or it may be distributed at various appropriate locations within the target PLMN 40. For instance, the SMU 46 could be implemented as part of the HLR 44 of the target PLMN 40. Alternatively, the SMU 46 can be provided in form of one or more dedicated hardware units.

Although the SMU 46 is preferably arranged and configured to monitor the complete process of the secure element 14 attaching to the target PLMN 40, the present invention covers also the case where the SMU 46 only monitors parts thereof, such as the initial attachment message, for instance, the "Send Authentication Information" message, for extracting the IMSI therefrom and as an indication that the secure element 14 can successfully attach to the target PLMN 40 and, therefore, has successfully switched from the provisional subscription profile 18*a* to the target subscription profile 18*b*.

According to a preferred embodiment of the invention it is conceivable that the SM server 50 provides the SMU 46 with information about those IMSIs that the SMU 46 should be looking for, when monitoring the communication flow within the target PLMN 40. More specifically, the SM server 50 could provide the SMU 46 with a list of IMSIs which are part of respective subscription profiles for attaching to the target PLMN 40, but which have not been confirmed yet to have successfully attached to the target PLMN 40. For instance, after or concurrently with the download of the subscription profile 18*b* for the target PLMN 40 in step S2 of FIG. 2 the SM server 50 could inform the SMU 46 about the corresponding target IMSI and that this target IMSI most likely will be used in the near future for trying to attach to the target PLMN 40.

In light of the above detailed description the person skilled in the art will appreciate that modifications and/or additions can be made to the methods, devices and systems as described heretofore, which are to be considered to remain within the scope of the present invention as defined by the appended claims.

The invention claimed is:

1. A method for performing a switch from a first mobile network to a second mobile network by a mobile terminal comprising a secure element, wherein the method comprises the following steps:
  (a) attaching to the first mobile network using a first attachment message containing a first identification data element of a first subscription profile, the first subscription profile comprising a provisional subscription profile having a limited subset of capabilities on the first mobile network; and
  (b) attaching to the second mobile network by an attachment process including a second attachment message containing a second identification data element of a second subscription profile, the second subscription profile comprising a full subscription profile having one or more capabilities that are not available with the provisional subscription profile, wherein the second mobile network is configured to monitor at least parts of the attachment process, to determine the second identification data element contained therein and to forward an indication of this determination to a subscription management server in order to confirm the successful attachment of the secure element to the second mobile network.

2. The method of claim 1, wherein the second mobile network is configured to detect the second attachment message containing the second identification data element.

3. The method of claim 1, wherein the method comprises the following additional step after step (b):
  (c) confirming to the secure element that the switch has been successful.

4. The method of claim 3, wherein in step (c) the secure management server provides the secure element with the MSISDN assigned to the second identification data element in the second mobile network.

5. The method of claim 1, wherein the second subscription profile including the second identification data element is downloaded by the secure element from the subscription management server, while the secure element is attached to the first mobile network.

6. The method of claim 5, wherein the step of downloading the second subscription profile includes the additional step of receiving commands from the subscription management server to be executed by the secure element.

7. The method of claim 1, wherein the method includes the additional step of informing the second mobile network about the second identification data element in order for the second mobile network to be able to monitor respective attachment processes.

8. The method of claim 1, wherein the second mobile network comprises a signal monitoring unit that is implemented in hardware and/or software and configured to monitor at least parts of the attachment process, to determine the second identification date element contained therein and to forward this information to a subscription management server in order to confirm the successful attachment of the secure element to the second mobile network.

9. The method of claim 1, wherein the first mobile network and/or the second mobile network are operated according to the GSM standard.

10. The method of claim 9, wherein the second attachment message is a "Send Authentication Information" message.

11. The method of claim 1, wherein the first subscription profile is a provisional subscription profile that is stored on the secure element during the manufacturing and/or personalization process of the mobile terminal and/or the secure element.

12. The method of claim 1, wherein the first identification data element is a first IMSI.

13. A secure element configured to perform the steps of the method according to claim 1.

14. The secure element of claim 13, wherein the secure element is a removable subscriber identity module (SIM) or an embedded part of the mobile terminal.

15. A mobile terminal containing a secure element according to claim 13.

16. A subscription management server configured to interact with the secure element of claim 13 according to the method for performing a switch from a first mobile network to a second mobile network by a mobile terminal comprising a secure element.

* * * * *